United States Patent
Yun

(10) Patent No.: US 11,818,990 B2
(45) Date of Patent: Nov. 21, 2023

(54) APPARATUS FOR PROVIDING OPTIMAL PEST CONTROL RECIPE DEPENDING ON PROGRESSION OF DISEASE AND PEST DAMAGE, AND METHOD THEREOF

(71) Applicant: SHERPA SPACE INC., Daejeon (KR)

(72) Inventor: Choa Mun Yun, Daejeon (KR)

(73) Assignee: SHERPA SPACE INC., Daejeon (KR)

( * ) Notice: Subject to any disclaimer, the term of this patent is extended or adjusted under 35 U.S.C. 154(b) by 463 days.

(21) Appl. No.: 17/091,799

(22) Filed: Nov. 6, 2020

(65) Prior Publication Data

US 2022/0061225 A1 Mar. 3, 2022

(30) Foreign Application Priority Data

Sep. 1, 2020 (KR) .......................... 10-2020-0110763

(51) Int. Cl.
*G06V 20/10* (2022.01)
*G06T 7/00* (2017.01)
(Continued)

(52) U.S. Cl.
CPC ........... *A01G 7/00* (2013.01); *G06Q 30/0631* (2013.01); *G06Q 30/0645* (2013.01);
(Continued)

(58) Field of Classification Search
CPC ........ G06T 2207/30188; G06V 20/188; G06V 20/194
See application file for complete search history.

(56) References Cited

U.S. PATENT DOCUMENTS

2014/0012732 A1* 1/2014 Lindores .............. A01B 79/005
                                                         705/37
2017/0096222 A1* 4/2017 Spinelli ................... B64F 1/222
(Continued)

FOREIGN PATENT DOCUMENTS

CA    2663917 A1 * 10/2010  ............. A01C 21/00
EP    3654272 A1 *  5/2020  ............. G06Q 10/04
(Continued)

OTHER PUBLICATIONS

Kansal et al., "Image Processing of Vegetables and Predicting Disease", 2019, International Journal of Innovative Technology and Exploring Engineering (IJITEE) ISSN: 2278-3075, vol. 8 Issue-11, Sep. 2019, pp. 3791-3797.*
(Continued)

*Primary Examiner* — Guillermo M Rivera-Martinez
(74) *Attorney, Agent, or Firm* — Harvest IP Law, LLP

(57) ABSTRACT

An apparatus for providing an optimal pest control recipe depending on a progress of disease and pest damages and a method thereof are provided. The apparatus for providing an optimal pest control recipe depending on a progress of disease and pest damages, in which the apparatus is connected with an photographing device and a user terminal, may include: an input module configured to receive image data of crops from the photographing device; a diagnosis module configured to analyze the image data to determine a type and progress of the disease and pest damages; a prescription module configured to generate a pest control recipe according to the determined progress of the disease and pest damages; and a communication module configured to transmit the pest control recipe to the user terminal.

18 Claims, 5 Drawing Sheets

(51) Int. Cl.
*A01G 7/00* (2006.01)
*G06Q 30/0601* (2023.01)
*G06Q 30/0645* (2023.01)
*G06Q 50/02* (2012.01)
*G01D 21/02* (2006.01)

(52) U.S. Cl.
CPC ........... *G06Q 50/02* (2013.01); *G06T 7/0002* (2013.01); *G06V 20/188* (2022.01); *G01D 21/02* (2013.01); *G06T 2200/24* (2013.01); *G06T 2207/30188* (2013.01)

(56) References Cited

U.S. PATENT DOCUMENTS

| | | |
|---|---|---|
| 2018/0065747 A1 | 3/2018 | Cantrell |
| 2019/0259108 A1* | 8/2019 | Bongartz ........... G06Q 10/0639 |
| 2019/0277749 A1* | 9/2019 | Rushing ................ G06T 7/0004 |

FOREIGN PATENT DOCUMENTS

| | | |
|---|---|---|
| EP | 3654272 A1 | 5/2020 |
| JP | 11287871 A | 10/1999 |
| JP | 2005176850 A | 7/2005 |
| KR | 1020140052547 | 5/2014 |
| KR | 10-2020-0057839 A | 5/2020 |
| KR | 1020200092496 | 8/2020 |

OTHER PUBLICATIONS

Abdulridha et al., Detecting powdery mildew disease in squash at different stages using UAV-based hyperspectral imaging and artificial intelligence, Biosystems Engineering, vol. 197, 2020, pp. 135-148, ISSN 1537-5110, //doi.org/10.1016/j.biosystemseng.2020.07.001.*

EP Search Report dated Mar. 18, 2021.

JP OA dated Feb. 28, 2022.

* cited by examiner

APPARATUS FOR PROVIDING OPTIMAL PEST CONTROL RECIPE DEPENDING ON PROGRESSION OF DISEASE AND PEST DAMAGE, AND METHOD THEREOF

CROSS-REFERENCE TO RELATED APPLICATION

This application claims priority from Korean Patent Application No. 10-2020-0110763, filed on Sep. 1, 2020 in the Korean Intellectual Property Office, the disclosure of which is incorporated herein by reference in its entirety.

BACKGROUND

1. Technical Field

Apparatuses and methods consistent with exemplary embodiments relate to an apparatus for providing an optimal pest control recipe depending on a progress of disease and insect damage, and a method thereof, and more particularly, to an apparatus for providing an optimal pest control recipe depending on a progress of disease and insect damage, and a method thereof, in which various methods of pest control recipes for exterminating disease and pest damages may be provided depending on a progression of disease and pest damages.

2. Description of the Related Art

In general, disease and pest damages are divided into disease damages and pest damages. The disease damage means that all useful plants, including crops such as grains, vegetables, fruit trees, flowers, or trees, are killed and decayed by pathogens, resulting in reduced yield or poor quality. The pest damage refers to the damage of eating and drinking by insects. Here, insects that damage plants are called pests.

The disease damage is caused by a pathogen parasitic to plants, but its spread is fast and the range of harm is wide. The degree of damage from a pest varies greatly depending on a type of pathogen, a type and variety of crops, a time of occurrence and weather conditions. The pathogen includes fungi, bacteria, mycoplasma, viruses, or viroids. The insect includes mites and nematodes, and a method of damage caused by a pest differs depending on the type of pest.

Conventionally, disease and pest damages are left unattended until they are visible and then a drug is sprayed. Therefore, there is a problem that the effect is insufficient if the drug is sprayed in a state in which disease and pest damages have progressed a lot. In addition, there are drawbacks that because spraying of other drugs, dilution ratio of drugs, or pest control methods are not classified according to n the progress of disease and pest damages, costs of pest control and use of chemical substances are high.

3. Bibliography

Project Number: PJ01533203
Project Unique Number: 1395066915
Organization Name: Rural Development Administration
Specialized Institution for Research Management: Rural Development Administration
Research Business Name: Agricultural Technology Management Research—Developing models for collecting agricultural big data and improving productivity
Research Project Name: Development of a program using images to detect early the occurrence of major pests in strawberries
Management Organization: Sherpa Space Inc.
Research Period: May 1, 2020-Dec. 31, 2024

SUMMARY

Aspects of one or more exemplary embodiments provide an apparatus and method for providing an optimal pest control recipe depending on a progress of disease and pest damages, which may provide various methods of pest control recipes for exterminating disease and pest damages depending on the progress of disease and pest damages.

Aspects of one or more exemplary embodiments also provide an apparatus and method for providing an optimal pest control recipe depending on a progress of disease and pest damages, in which it may exterminate the disease and pest damages depending on the progress of the disease and pest damages, so that early pest control is possible, reducing cost of the pest control and the use of chemical substances.

Aspects of one or more exemplary embodiments also provide an apparatus and method for providing an optimal healing recipe for disease and pest damages, in which when pest damages occur, a photographing cycle of crops may be changed, and a pest control recipe may be continuously updated as the crops heals.

Additional aspects will be set forth in part in the description which follows and, in part, will become more apparent from the description, or may be learned by practice of the exemplary embodiments.

According to an aspect of an exemplary embodiment, there is provided an apparatus for providing an optimal pest control recipe depending on a progress of disease and pest damages, the apparatus being connected with a photographing device and a user terminal, including: an input module configured to receive image data of crops from the photographing device; a diagnosis module configured to analyze the image data to determine the type and progress of the disease and pest damages; a prescription module configured to generate a pest control recipe according to the determined progress of the disease and pest damages; and a communication module configured to transmit the pest control recipe to the user terminal.

The input module may further receive environmental information including at least one of temperature, humidity, light quantity, light wavelength, $CO_2$ concentration, and soil pH measured by a temperature sensor, a humidity sensor, an optical sensor, a gas sensor, and a soil sensor installed in a cultivation plot.

The diagnosis module may analyze the image data and the environmental information to determine the type and progress of the disease and pest damages.

The pest control recipe may include at least one of a physical remedy, a biological remedy, and a chemical remedy.

The physical remedy may be at least one of adjusting temperature, adjusting humidity, adjusting light quantity, adjusting light wavelength, and adjusting a ventilation cycle, the biological remedy may include installing either a blocking net or a pheromone trap, and the chemical remedy may be at least one of spraying pesticides and adjusting soil pH.

The pest control recipe may include a plurality of selectable pesticides, a dilution degree of the selected pesticide, and a spray cycle of the selected pesticide.

The pest control recipe may further include cure period information for each pesticide that provides an optimal remedy in a cultivation environment similar to the environmental information to help a user to select.

The pest control recipe may further include comparative information of a cure period for each pesticide in a cultivation environment similar to the environmental information.

The pest control recipe may further include a purchase method and price of the selected pesticide, a purchase or rental method and price of pest control equipment.

The apparatus for providing an optimal pest control recipe depending on a progress of disease and pest damages may further include a setting module, if the type and progress of the disease and pest damages are diagnosed by the diagnosis module, configured to change a photographing cycle according to the type and progress of the disease and pest damages and transmit an instruction to change the imaging cycle to the photographing device so that photographing is performed with the changed photographing cycle.

According to an aspect of another exemplary embodiment, there is provided a method for providing an optimal pest control recipe in a pest control server connected to a photographing device and a user terminal including: receiving, by an input module, image data of crops from the photographing device; analyzing, by a diagnosis module, the image data to determine a type and progress of the disease and pest damages; generating, by a prescription module, a pest control recipe according to the determined progress of the disease and pest damages; and transmitting, by a communication module, the pest control recipe to the user terminal.

The pest control recipe may include at least one of a physical remedy, a biological remedy, and a chemical remedy.

The physical remedy may be at least one of adjusting temperature, adjusting humidity, adjusting light quantity, adjusting light wavelength, and adjusting a ventilation cycle, the biological remedy may include installing a pheromone trap, and the chemical remedy may be at least one of spraying pesticides and adjusting soil pH.

The pest control recipe may include a plurality of selectable pesticides, a dilution degree of the selected pesticide, and a spray cycle of the selected pesticide.

The pest control recipe may further include a purchase method and price of the selected pesticide, a purchase or rental method and price of pest control equipment.

The pest control recipe may further include expert information on the crops or the disease and pest damages.

The prescription module may update and provide the pest control recipe according to the healing process of the healing crop.

According to one or more exemplary embodiments, it is possible to efficiently control pests by providing various methods of pest control recipes for controlling the pests depending on a progress of disease and pest damages. In addition, it is possible to increase the convenience of a user's purchase of pesticides by providing information on a purchase method and price of pesticides to exterminate the disease and pest damages.

Further, according to one or more exemplary embodiments, it may exterminate the disease and pest damages depending on the progress of the disease and pest damages, so that early pest control is possible, reducing cost of the pest control and the use of chemical substances.

Further, according to one or more exemplary embodiments, when pest damages occur, a photographing cycle of crops may be changed, and a pest control recipe may be continuously updated as the crops heal. Therefore, it may increase the efficiency of controlling the disease and pest damages.

The benefits of one or more exemplary embodiments are not limited to those mentioned above, and other benefits that are not mentioned will be clearly understood by those skilled in the art from the following description.

BRIEF DESCRIPTION OF THE DRAWINGS

The above and other aspects and features will become more apparent from the following description of the exemplary embodiments with reference to the accompanying drawings, in which.

DETAILED DESCRIPTION

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

In the following description, when it is considered that the detailed description for the related known art may blur the gist of the exemplary embodiments, the detailed description thereof will be omitted.

The term used herein is only used to describe the particular embodiments and is not intended to limit the embodiments. Unless the context clearly means otherwise, the singular expression includes plural expression. It should be understood that, herein, the terms "comprises" or "have," etc. are intended to specify that there is a stated feature, number, step, operation, component, part, or a combination thereof herein, and it does not exclude in advance the possibility of presence or addition of one or more other features, numbers, steps, operations, components, parts, or combinations thereof.

Unless otherwise defined, all terms used herein, including technical and scientific terms, have the same meaning as commonly understood by those of ordinary skill in the art to which the exemplary embodiments belong. Terms as defined in a commonly used dictionary should be interpreted as having a meaning consistent with the meaning of the related technology, and they are not to be construed in an ideal or excessively formal sense unless explicitly defined in the present application.

The term module described herein means a unit that processes a specific function or operation, and may mean hardware or software, or a combination of hardware and software.

In addition, the terms first, second, etc. may be used to describe various elements, but the elements should not be limited by the terms. The terms are used only for the purpose of distinguishing one component from another.

Hereinbelow, it is understood that expressions such as "at least one of a, b or c" and "a, b, and/or c" means only a, only b, only c, both a and b, both a and c, both b and c, all of a, b, and c, or variations thereof.

Hereinafter, the exemplary embodiments will be described in detail with reference to the accompanying drawings. In the description with reference to the accompanying drawings, the same or corresponding components are assigned the same reference numbers regardless of drawing numbers, and redundant description thereof will be omitted.

Hereinafter, an apparatus 100 for providing an optimal pest control recipe depending on a progress of disease and pest damages according to a first exemplary embodiment will be described in detail with reference to the drawings.

Figure 1:
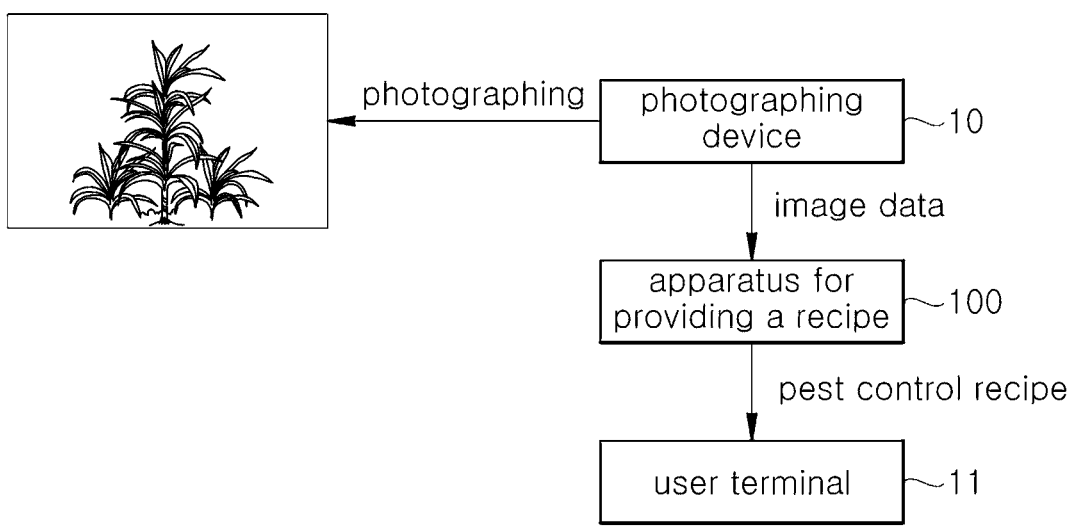
FIG. 1 is a schematic diagram illustrating an apparatus for providing an optimal pest control recipe depending on a progress of disease and pest damages according to an exemplary embodiment.

FIG. 1 is a schematic diagram illustrating the apparatus 100 for providing the optimal pest control recipe depending on the progress of disease and pest damages according to an exemplary embodiment.

Referring to FIG. 1, the apparatus 100 for providing the optimal pest control recipe depending on the progress of disease and pest damages according to the exemplary embodiment may analyze image data of crops photographed by an photographing device 10 to diagnose a type and progression of disease and pest damages in the crops, and provide a user terminal 11 with an optimal pest control recipe for preventing or exterminating disease and pest damages based on a diagnosis result. In the embodiment, it will be described as an example in which the image data photographed by the photographing device 10 is directly transmitted to the apparatus 100 for providing the recipe. However, the image data may be first transmitted to the user terminal 11 and transmitted to the apparatus 100 for providing the recipe through the user terminal 11.

The photographing device 10 may be installed at least one or more in a cultivation plot where crops are grown, and photographs the crops at a preset cycle. The photographing device 10 may take a picture or take a video of an entire part or part of the crops (for example, a front surface of a leaf, a rear surface of a leaf, or a stem), and may photograph crops by applying various filters according to settings. In addition, the photographing device 10 may photograph the crops using at least one of an RGB sensor, a thermal image sensor, or a multispectral sensor.

The RGB sensor expresses a picture or image by mixing red, green, and blue, and the thermal image sensor expresses a subject in different colors depending on temperature. The multispectral sensor obtains images in typically ten or fewer discrete bands within a visible region and an infrared region, and generates independent data for each pixel because the regions are separated.

The user terminal 11 may include a laptop computer, a smart phone, a tablet PC, a personal digital assistant (PDA), an enterprise digital assistant (EDA), a mobile internet device (MID, and an e-book. The user terminal 11 may further include a display device (e.g., a monitor installed on a cultivation plot) capable of outputting a pest control recipe provided from the apparatus 100 for providing the recipe.

The photographing device 10, the apparatus 100 for providing the recipe, and the user terminal 11 may transmit and receive signals through short-range wireless communication such as Bluetooth (BLE), Wifi, Zigbee, or the like or broadband wireless communication such as LoRa (Long Range) or mobile communication network.

It is understood that the kind of disease and pest damages occurring on crops is not limited to any one kind. For example, the disease damage may include any one of fungi, bacteria, mycoplasma, viruses, and viroids, and the pest damage may include any one of mite, snapworm, aphid, greenhouse dust, shield bug, and rootfly. However, it is not limited thereto.

Figure 2:
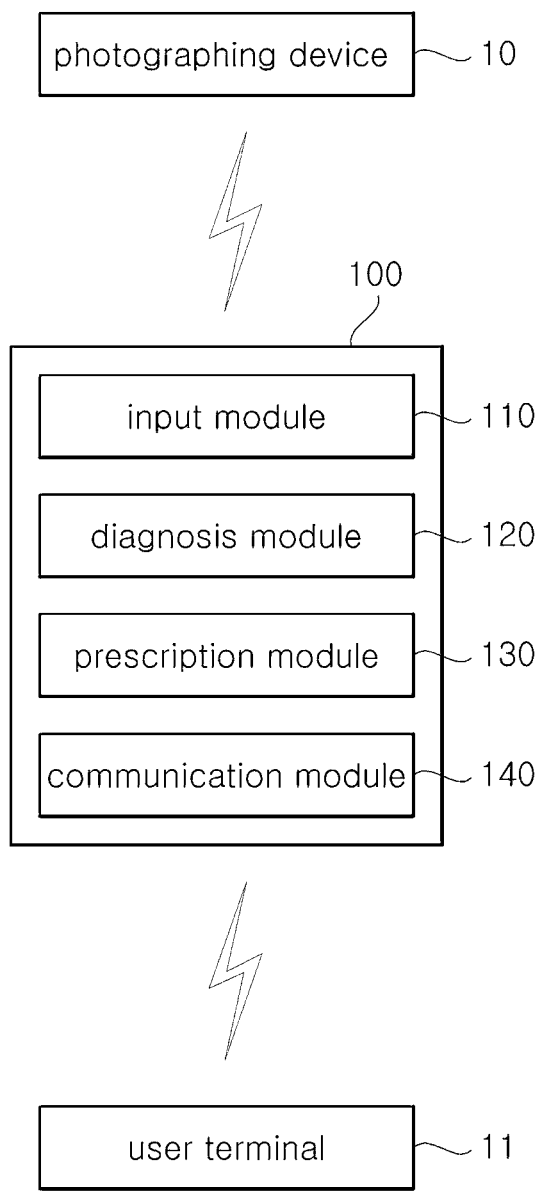
FIG. 2 is a block diagram illustrating a configuration of the apparatus for providing the optimal pest control recipe depending on the progress of the disease and pest damages illustrated in FIG. 1.

FIG. 2 is a block diagram illustrating a configuration of the apparatus 100 for providing the optimal pest control recipe depending on the progress of the disease and pest illustrated in FIG. 1.

Referring to FIG. 2, the apparatus 100 for providing the optimal pest control recipe depending on the progression of the disease and pest includes an input module 110, a diagnosis module 120, a prescription module 130, and a communication module 140.

The input module 110 receives image data of crops from the photographing device 10. The input module 110 may be directly connected to the photographing device 10 to receive the image data, or may be wirelessly connected to receive the image data. Also, the input module 110 may receive the image data using a removable storage device such as a USB device. However, the photographing device 10 may provide the image data to the user terminal 11, and the input module 110 may communicate with the user terminal 11 to receive the image data.

The input module 110 may receive environment information that senses a cultivation environment from a plurality of sensors installed in a cultivation plot. For example, any one of a temperature sensor, a humidity sensor, a light sensor, a gas sensor, and a soil sensor is provided in the cultivation plot, and the input module 110 may receive the environmental information of at least one of temperature, humidity, light quantity, light wavelength, $CO_2$ concentration, and soil pH of the cultivation plot measured from these sensors.

The diagnosis module 120 analyzes the image data input to the input module 110 to determine a type and progression of disease and pest damages generated in the crops. The diagnosis module 120 determines the type and progression of the disease and pest damages by using an image analysis algorithm, or compares it with the image data of the crops in a normal state stored in advance to determine the type and progression of the disease and pest damages.

In addition, the diagnosis module 120 may comprehensively analyze the image data provided from the photographing device 10 and the environmental information provided from the plurality of sensors to determine the type and progression of the disease and pest damages.

For example, when the diagnosis module 120 analyzes the image data and diagnoses that disease and pest damages for a root gall disease has occurred in the crops, but if there is a condition in which the root gall disease is difficult to occur in relation to the soil pH among the provided environmental information, it may improve the accuracy of a diagnosis result of disease and pest by re-analyzing it based on the environmental information in a state in which the diagnosis result of the initially diagnosed root gall disease is tentatively determined.

The prescription module 130 generates a pest control recipe depending on the disease and pest damages and the progression thereof diagnosed by the diagnosis module 120. For example, the prescription module 130 generates a pest control recipe including at least one of a physical remedy, a biological remedy, and a chemical remedy.

The physical remedy for the pest control recipe generated in the prescription module 130 may include any one of adjusting temperature, adjusting humidity, adjusting light quantity, adjusting light wavelength, and adjusting a ventilation cycle of a cultivation plot. For example, the prescription module 130 may present an optimum temperature for exterminating disease and pests when the generated disease and pest damages are weak in temperature.

For example, the prescription module 130 may compare a physical remedy for exterminating the generated disease and pests with environmental information of a cultivation plot, and generate a pest control recipe based on a condition having the largest comparison value.

The biological remedy for the pest control recipe generated in the prescription module 130 includes any one of a blocking net installation and a pheromone trap installation. The biological remedy prevents access to pests or attracts pests to other places and kills them. For example, the blocking net is installed around crops to prevent access to pests, and a pest repellent may be applied to the outside of the blocking net. The pheromone trap is a device that attracts and kills pests using sex attractants. The pheromone traps may use appropriate traps according to behavioral habits of target pests.

The chemical remedy for the pest control recipe generated in the prescription module 130 may include at least one of spraying pesticides and adjusting soil pH. The chemical remedy uses spraying pesticide and adjusting soil pH to directly remove pests or create an environment where pests do not survive.

The prescription module 130 may provide a step-by-step or sequential remedy for controlling disease and pest damages depending on a progression of the disease and pest damages. For example, the progression of the disease and pests may be staged into stages 1 to 3, and a physical remedy may be suggested in the first stage, where the progression of the disease and pests is relatively weak. In addition, in stage 3, where the progression of the disease and pest damages is highest, a chemical remedy (e.g., spraying pesticides) may be suggested for rapid extermination of the disease and pest damages.

If spraying pesticide among a chemical remedy is included in the pest control recipe generated by the prescription module 130, the prescription module 130 may include information on a plurality of selectable pesticides together in the pest control recipe to exterminate disease and pest damages generated in crops. In addition, the prescription module 130 may also include information on a dilution degree of the selected pesticide and a spray cycle of the selected pesticide in the corresponding pest control recipe.

When providing the information on the plurality of selectable pesticides through the pest control recipe, the prescription module 130 may also provide information for helping a user to select a pesticide among the plurality of selectable pesticides. For example, the prescription module 130 may further provide information on a cure period of disease and pest damages in a cultivation environment similar to environmental information of a cultivation plot.

Here, the prescription module 130 may help the user to select a pesticide by providing comparison information of a cure period for each pesticide in a similar cultivation environment with the environmental information of the cultivation plot.

In addition, when providing information on the plurality of selectable pesticides through the pest control recipe, the prescription module 130 may provide information on a purchase method and price of pesticides together. Further, the prescription module 130 may provide information on a purchase or rental method and price of pest control equipment.

For example, the prescription module 130 receives location information of a cultivation plot, and generates price information of agricultural chemical products sold at an offline agricultural chemical store located near the cultivation plot in the pest control recipe. In addition, the prescription module 130 may generate information including price information, delivery information, etc. of the agricultural chemical products sold at the online agricultural chemical store in the pest control recipe.

The communication module 140 communicates with the user terminal 11 to provide the pest control recipe generated by the prescription module 130 to the user terminal 11. In addition, the communication module 140 may also communicate with the photographing device 10. The communication module 140 may communicate with the user terminal 11 or the photographing device 10 through short-range wireless communication such as Bluetooth (BLE), Wifi, Zigbee, or the like or broadband wireless communication such as LoRa (Long Range) or mobile communication network.

Accordingly, the apparatus 100 for providing the optimal pest control recipe depending on the progress of the disease and pest may efficiently control the disease and pest damages by providing various methods of healing depending on the progress of the disease and pest. In addition, it may increase the convenience of a user's purchase of pesticides by providing information on a purchase method and price of pesticides for controlling the disease and pest damages.

In the apparatus 100 for providing the optimal pest control recipe depending on the progress of the disease and pest, the input module 110 may receive weather information or a weather forecast of an area where a cultivation plot is located, and the prescription module 130 may generate a pest control recipe based on the weather information.

For example, the prescription module 130 may regenerate by reinforcing an already generated pest control recipe by one step when it is weather in which the activity amount of pests increases or when such weather is forecast. In addition, when it is weather in which the activity amount of pests decreases, or when such weather is forecast, the already generated pest control recipe may be regenerated by weakening one step.

Hereinafter, an apparatus for providing an optimal pest control recipe depending on a progress of disease and pest according to a second exemplary embodiment will be described in detail with reference to the drawings.

Figure 3:
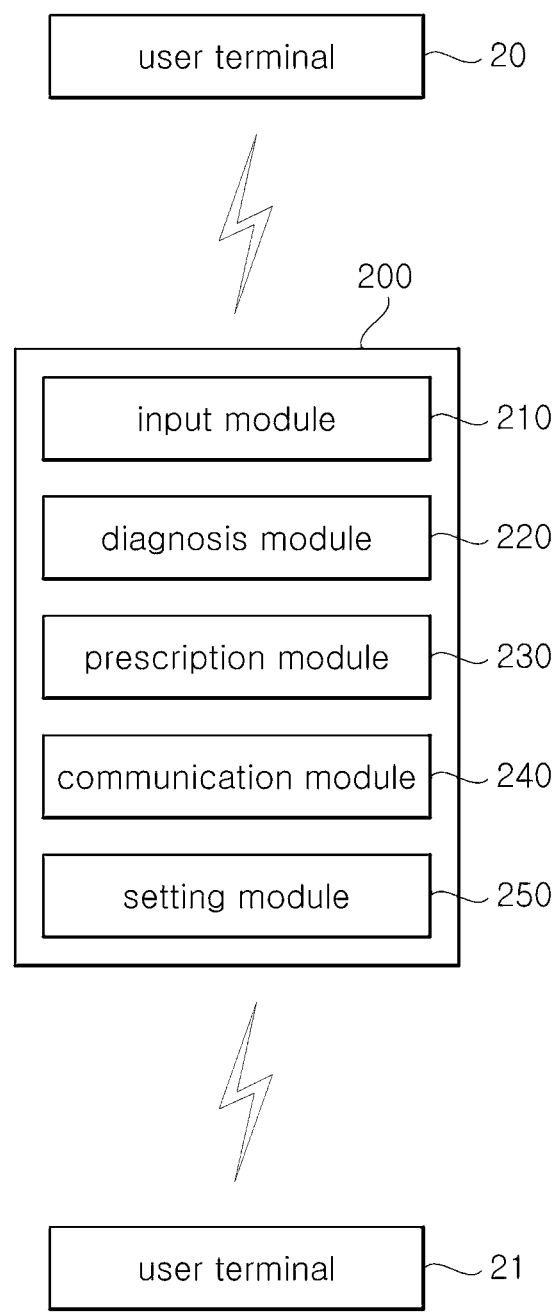
FIG. 3 is a block diagram illustrating an apparatus for providing an optimal pest control recipe depending on a progress of disease and pest damages according to a second exemplary embodiment.

FIG. 3 is a block diagram illustrating an apparatus 200 for providing an optimal pest control recipe depending on a progress of disease and pest damages according to the second exemplary embodiment.

The apparatus 200 for providing the optimal pest control recipe depending on the progress of the disease and pests according to the second exemplary embodiment further includes a setting module 250 in the apparatus 100 for providing the optimum pest control recipe depending on the progress of the disease and pests of the first exemplary embodiment. Because a configuration and effect of an input module 210, a diagnosis module 220, a prescription module 230 and a communication module 240 of the second exemplary embodiment are the same as the input module 110, the diagnosis module 120, the prescription module 130, and the communication module 140, duplicate descriptions are omitted.

Referring to FIG. 3, the apparatus 200 for providing the optimal pest control recipe depending on the progress of the disease and pest further includes the setting module 250.

When the type and progression of disease and pest damages are diagnosed by the diagnosis module 220, the setting module 250 generates a control signal for changing a photographing cycle according to the type and progression of the corresponding disease and pest damages. The control signal generated by the setting module 250 may be transmitted to a photographing device through the communication module 240.

For example, if the type of disease and pest damages generated in crops is relatively difficult to exterminate, or if a progression of disease and pest damages has progressed significantly, the setting module 250 may shorten a photographing cycle of crops, and the diagnosis module 220 may closely observe or analyze the progression or healing of disease and pest damages generated in the crops according to the shortened photographing cycle.

In addition, the prescription module 230 may continuously update the pest control recipe according a healing progression of the crops being healed based on the shortened photographing cycle. For example, when the progression of the disease and pests of the crops being healed is continuously strengthened, the prescription module 230 may provide a stronger pest control recipe to quickly exterminate the disease and pest damages.

A third exemplary embodiment relates to a method for controlling disease and pest damages using the apparatus for providing the optimal pest control recipe depending on the progress of the disease and pest damages of the first exemplary embodiment or the second exemplary embodiment.

Figure 4:
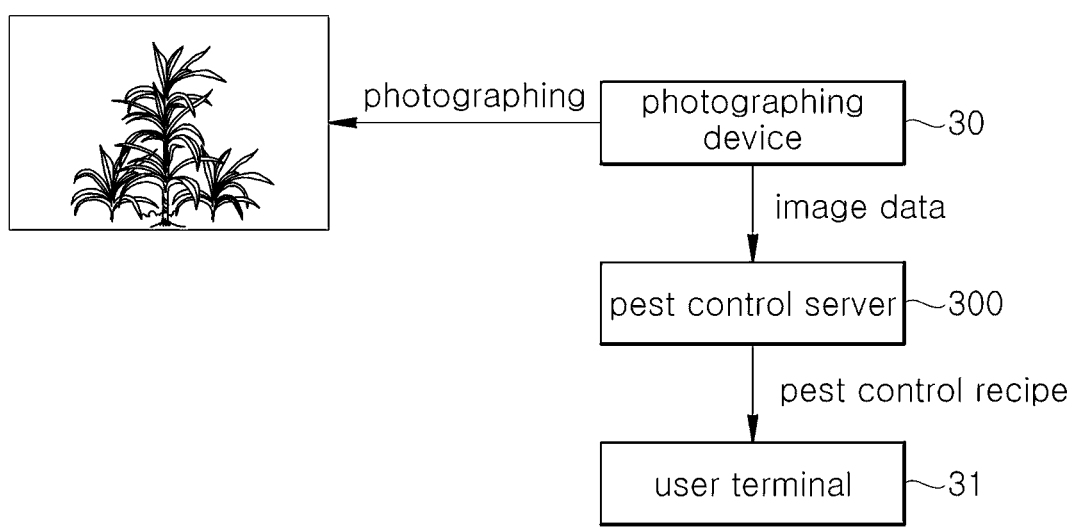
FIG. 4 is a schematic diagram illustrating an apparatus for providing an optimal pest control recipe depending on a progress of disease and pest damages according to a third exemplary embodiment.

FIG. 4 is a schematic diagram illustrating an apparatus for providing an optimal pest control recipe depending on a progress of disease and pests according to the third exemplary embodiment.

Referring to FIG. 4, according to a method for providing an optimal pest control recipe depending on a progress of disease and pest, a pest control server 300 may analyze image data of crops photographed by a photographing device 30 to diagnose the type and progression of disease and pest damages occurring in the crops, and based on a diagnosis result, an optimal pest control recipe for preventing or exterminating disease and pest damages may be provided to a user terminal 31. In the embodiment, it will be described as an example in which image data photographed by the photographing device 30 is directly transmitted to the pest control server 300. However, the image data may be first transmitted from the photographing device 30 to the user terminal 31 and may be transmitted to the pest control server 300 through the user terminal 31.

The photographing device 30, the pest control server 300, and the user terminal 11 may transmit and receive signals through short-range wireless communication such as Bluetooth (BLE), Wifi, Zigbee, or the like or broadband wireless communication such as LoRa (Long Range) or mobile communication network.

Here, the kind of disease and pest damages to control is not limited to any one kind. For example, it may include any one of mite, snapworm, aphid, greenhouse dust, shield bug, and rootfly, but it is not limited thereto.

Figure 5:
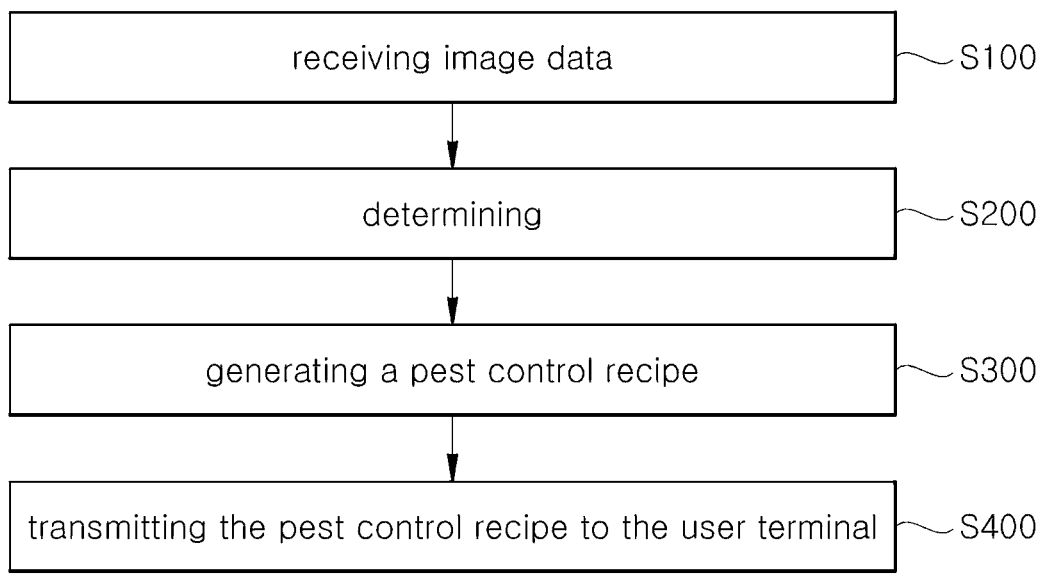
FIG. 5 is a flowchart illustrating a method for providing an optimal pest control recipe depending on the progress of the disease and pest damages according to the third exemplary embodiment illustrated in FIG. 4.

FIG. 5 is a flowchart illustrating a method for providing an optimal pest control recipe depending on a progress of disease and pest damages according to the third exemplary embodiment illustrated in FIG. 4.

Referring to FIG. 5, a method for providing an optimal pest control recipe depending on a progress of disease and pest include receiving image data (operation S100), determining (operation S200), generating a pest control recipe (operation S300), transmitting the pest control recipe to a user terminal (operation S400).

In operation S100 of receiving the image data, an input module receives image data of crops from a photographing device. The input module may be wirelessly connected to receive image data. For example, the photographing device may provide image data to a user terminal, and the input module may communicate with the user terminal to receive the image data.

The input module in operation S100 of receiving the image data may receive the image data and environment information that senses a cultivation environment from a plurality of sensors installed in a cultivation plot. For example, any one of a temperature sensor, a humidity sensor, a light sensor, a gas sensor, and a soil sensor is provided in the cultivation plot, and the input module may receive the environmental information of at least one of temperature, humidity, light quantity, light wavelength, $CO_2$ concentration, and soil pH of the cultivation plot measured from these sensors.

In operation S200 of determining, a diagnosis module analyzes the image data input to the input module to determine the type and progression of disease and pest damages generated in the crops. The diagnosis module may determine the type and progression of the disease and pest damages by using an image analysis algorithm, or compare it with the image data of the crops in a normal state stored in advance to determine the type and progression of the disease and pest damages.

For example, the diagnosis module comprehensively analyzes the image data provided from the photographing device and the environmental information provided from the plurality of sensors to determine the type and progression of the disease and pest damages.

For example, when the diagnosis module analyzes the image data and diagnoses that disease and pest damages for a root gall disease has occurred in the crops, but if there is a condition in which the root gall disease is difficult to occur in relation to the soil pH among the provided environmental information, it may improve the accuracy of a diagnosis result of disease and pest by re-analyzing it based on the environmental information in a state in which the diagnosis result of the initially diagnosed root gall disease is tentatively determined.

In operation S300 of generating a pest control recipe, a prescription module generates a pest control recipe depending on the disease and pest damages and the progression thereof diagnosed by the diagnosis module. For example, the prescription module generates a pest control recipe including at least one of a physical remedy, a biological remedy, and a chemical remedy.

The physical remedy for the pest control recipe generated in the prescription module may include any one of adjusting temperature, adjusting humidity, adjusting light quantity, adjusting light wavelength, and adjusting a ventilation cycle of a cultivation plot. For example, the prescription module may present an optimum temperature for exterminating disease and pests when the generated disease and pest damages are weak in temperature.

For example, the prescription module may compare a physical remedy for exterminating the generated disease and pests with environmental information of a cultivation plot, and generate a pest control recipe based on a condition having the largest comparison value.

The biological remedy for the pest control recipe generated in the prescription module includes any one of a blocking net installation and a pheromone trap installation. The biological remedy prevents access to pests or attracts pests to other places and kills them. For example, the blocking net may be installed around crops to prevent access to pests, and a pest repellent may be applied to the outside of the blocking net. The pheromone trap is a device that attracts and kills pests using sex attractants. The pheromone traps may use appropriate traps according to behavioral habits of target pests.

The chemical remedy for the pest control recipe generated in the prescription module may include at least one of spraying pesticides and adjusting soil pH. The chemical remedy uses spraying pesticide and adjusting soil pH to directly remove pests or create an environment where pests do not survive.

The prescription module may provide a step-by-step or sequential remedy for controlling disease and pest damages depending on a progression of the disease and pest damages. For example, the progression of the disease and pests may be staged into stages 1 to 3, and a physical remedy may be suggested in the first stage, where the progression of the disease and pests is relatively weak. In addition, in stage 3, where the progression of the disease and pest damages is highest, a chemical remedy (e.g., spraying pesticides) may be suggested for rapid extermination of the disease and pest damages.

If spraying pesticide among a chemical remedy is included in the pest control recipe generated by the prescription module, the prescription module may generate information on a plurality of selectable pesticides together in the pest control recipe to exterminate disease and pest damages generated in crops. In addition, the prescription module may also generate information on a dilution degree of the selected pesticide and a spray cycle of the selected pesticide in the corresponding pest control recipe.

When providing the information on the plurality of selectable pesticides through the pest control recipe, the prescription module may also provide information for helping a user to select a pesticide among the plurality of selectable pesticides. For example, the prescription module may further provide information on a cure period of disease and pest damages in a cultivation environment similar to environmental information of a cultivation plot.

Here, the prescription module may help the user to select a pesticide by providing comparison information of a cure period for each pesticide in a similar cultivation environment with the environmental information of the cultivation plot.

When providing information on the plurality of selectable pesticides through the pest control recipe, the prescription module may provide information on a purchase method and price of pesticides together. Further, the prescription module may provide information on a purchase or rental method and price of pest control equipment.

For example, the prescription module receives location information of a cultivation plot, and generates price information of agricultural chemical products sold at an offline agricultural chemical store located near the cultivation plot in the pest control recipe. In addition, the prescription module may generate price information, delivery information, etc. of the agricultural chemical products sold at the online agricultural chemical store in the pest control recipe.

In the operation S400 of transmitting the pest control recipe to the user terminal, a communication module communicates with the user terminal to provide the pest control recipe generated by the prescription module to the user terminal. In addition, the communication module may also communicate with the photographing device. The communication module may communicate with the user terminal or the photographing device through short-range wireless communication such as Bluetooth (BLE), Wifi, Zigbee, or the like or broadband wireless communication such as LoRa (Long Range) or mobile communication network.

Operation S300 of generating the pest control recipe may include changing a photographing cycle. In the changing the photographing cycle, when the type and progression of disease and pest damages are diagnosed by the diagnosis module, the setting module 250 generates a control signal for changing a photographing cycle according to the type and progression of the corresponding disease and pest damages. The control signal generated by the setting module 250 may be transmitted to the photographing device through the communication module.

For example, if the type of disease and pest damages generated in crops is relatively difficult to exterminate, or if a progression of disease and pest damages has progressed significantly, the setting module 250 may shorten a photographing cycle of crops, and the diagnosis module 220 may closely observe or analyze the progression or healing of disease and pest damages generated in the crops according to the shortened photographing cycle.

In addition, the prescription module 230 may continuously update the pest control recipe according the healing process of the crops being healed based on the shortened photographing cycle. For example, when the progression of the disease and pests of the crops being healed is continuously strengthened, the prescription module 230 may provide a stronger pest control recipe to quickly exterminate the disease and pest damages.

On the other hand, in operation S300 of generating the pest control recipe, the prescription module may receive weather information or a weather forecast of an area where a cultivation plot is located, and generate a pest control recipe based on the weather information. For example, the weather information or the weather forecast may be provided through the input module.

For example, the prescription module may regenerate by reinforcing an already generated pest control recipe by one step when it is weather in which the activity amount of pests increases or when such weather is forecast. In addition, when it is weather in which the activity amount of pests decreases, or when such weather is forecast, the already generated pest control recipe may be regenerated by weakening one step.

It will be readily understand by those skilled in the art that the entire or partial functions of the present disclosure described above may be implemented as software translated into machine language by combining a series of program instructions, data files, or data structures alone or in combination, or may be provided by being included in a recording medium in which such software may be read through a computer. An example of the computer readable recording medium includes magnetic media such as hard disks, floppy disks, and magnetic tapes, optical media such as CD-ROMs and DVDs, magneto-optical media such as floptical disks, and hardware devices specially configured to store and execute program instructions such as ROMs, RAMs, flash memories, USB memories, or the like. An example of the program instructions includes high-level language codes that may be executed by a computer using an interpreter or the like, in addition to machine language codes such as those produced by a compiler. The hardware device may be configured to operate as one or more software modules to perform the operation of the present disclosure.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. An apparatus for providing pest control recipe, the apparatus being connected with a photographing device and a user terminal, comprising:
    an input module configured to receive image data of crops from the photographing device;
    a diagnosis module configured to analyze the image data to determine a type and progress of disease and pest damages in the crops, the disease damage including at least one of fungi, bacteria, mycoplasma, viruses, and viroids and the pest damage including at least one of mite, snapworm, aphid, greenhouse dust, shield bug, and rootfly;
    a prescription module configured to generate the pest control recipe according to the determined type and progress of the disease and pest damages; and
    a communication module configured to transmit the pest control recipe to the user terminal.

2. The apparatus of claim 1, wherein the input module further receives environmental information including at least one of temperature, humidity, light quantity, light wavelength, carbon dioxide ($CO_2$) concentration, and soil potential hydrogen (pH) measured by a temperature sensor, a humidity sensor, an optical sensor, a gas sensor, and a soil sensor installed in a cultivation plot.

3. The apparatus of claim 2, wherein the diagnosis module analyzes the image data and the environmental information to determine the type and progress of the disease and pest damages.

4. The apparatus of claim 2, wherein the pest control recipe comprises at least one of a physical remedy, a biological remedy, and a chemical remedy.

5. The apparatus of claim 4, wherein the physical remedy is at least one of adjusting temperature, adjusting humidity, adjusting light quantity, adjusting light wavelength, and adjusting a ventilation cycle,
    wherein the biological remedy comprises installing at least one of a blocking net or a pheromone trap, and
    wherein the chemical remedy is at least one of spraying pesticides and adjusting soil pH.

6. The apparatus of claim 5, wherein the pest control recipe comprises a plurality of selectable pesticides, a dilution degree of the selected pesticide, and a spray cycle of the selected pesticide.

7. The apparatus of claim 6, wherein the pest control recipe further comprises cure period information for each pesticide to heal the disease and pest damages in a cultivation environment similar to the environmental information to help a user to select.

8. The apparatus of claim 7, wherein the pest control recipe further comprises comparative information on a cure period for each pesticide in a cultivation environment similar to the environmental information.

9. The apparatus of claim 6, wherein the pest control recipe further comprises a purchase method and price of the selected pesticide, a purchase or rental method and price of pest control equipment.

10. The apparatus of claim 1, further comprising:
    a setting module, if the type and progress of the disease and pest damages are diagnosed by the diagnosis module, configured to change a photographing cycle depending on the type and progress of the disease and pest damages and transmit an instruction to change the photographing cycle to the photographing device so that photographing is performed with the changed photographing cycle.

11. A method for providing a pest control recipe in a pest control server connected to a photographing device and a user terminal, the method comprising:
    receiving, by an input module, image data of crops from the photographing device;
    analyzing, by a diagnosis module, the image data to determine a type and progress of disease and pest damages in the crops, the disease damage including at least one of fungi, bacteria, mycoplasma, viruses, and viroids and the pest damage including at least one of mite, snapworm, aphid, greenhouse dust, shield bug, and rootfly;
    generating, by a prescription module, the pest control recipe according to the determined type and progress of the disease and pest damages; and
    transmitting, by a communication module, the pest control recipe to the user terminal.

12. The method of claim 11, wherein the pest control recipe comprises at least one of a physical remedy, a biological remedy, and a chemical remedy.

13. The method of claim 12, wherein the physical remedy is at least one of adjusting temperature, adjusting humidity, adjusting light quantity, adjusting light wavelength, and adjusting a ventilation cycle,
    wherein the biological remedy comprises installing either a blocking net or a pheromone trap, and
    wherein the chemical remedy is at least one of spraying pesticides and adjusting soil pH.

14. The method of claim 13, wherein the pest control recipe comprises a plurality of selectable pesticides, a dilution degree of the selected pesticide, and a spray cycle of the selected pesticide.

15. The method of claim 14, wherein the pest control recipe further comprises a purchase method and price of the selected pesticide, a purchase or rental method and price of pest control equipment.

16. The method of claim 14, wherein the pest control recipe further comprises expert information on the crops or the disease and pest damages.

17. The method of claim 11, wherein the generating comprises updating, by the prescription module, the pest control recipe according to a healing progression of the crops being healed and providing the updated pest control recipe.

18. An apparatus for providing a healing recipe, the apparatus communicable with a photographing device and a user terminal, comprising:
    an input module configured to receive image data of crops from the photographing device;

a diagnosis module configured to analyze the image data to determine a type and progress of disease and pest damages in the crops, the disease damage in the crops being damages caused by a pathogen and the pest damage being damages caused by a pest;
a prescription module configured to generate a pest control recipe according to the determined type and progress of the disease and pest damages; and
a communication module configured to transmit the pest control recipe to the user terminal.

* * * * *